US011586175B2

(12) United States Patent
Horikawa et al.

(10) Patent No.: US 11,586,175 B2
(45) Date of Patent: Feb. 21, 2023

(54) TOOL, TASK MANAGEMENT DEVICE, TASK MANAGEMENT METHOD, AND TASK MANAGEMENT SYSTEM

(71) Applicants: CONNECTEC JAPAN Corporation, Niigata (JP); FUJIKIN INCORPORATED, Osaka (JP)

(72) Inventors: Kazutoshi Horikawa, Niigata (JP); Toru Nebashi, Niigata (JP); Hidekazu Machida, Niigata (JP); Nozomi Shimoishizaka, Niigata (JP); Akihiro Harada, Osaka (JP); Masahiko Ochiishi, Osaka (JP); Yoshiaki Yamato, Osaka (JP); Hiroki Karube, Osaka (JP); Mutsunori Koyomogi, Osaka (JP); Tsutomu Shinohara, Osaka (JP)

(73) Assignees: CONNECTEC JAPAN CORPORATION, Niigata (JP); FUJIKIN INCORPORATED, Osaka (JP)

( * ) Notice: Subject to any disclaimer, the term of this patent is extended or adjusted under 35 U.S.C. 154(b) by 339 days.

(21) Appl. No.: 16/765,669

(22) PCT Filed: Dec. 3, 2018

(86) PCT No.: PCT/JP2018/044357
§ 371 (c)(1),
(2) Date: May 20, 2020

(87) PCT Pub. No.: WO2019/111846
PCT Pub. Date: Jun. 13, 2019

(65) Prior Publication Data
US 2020/0301401 A1  Sep. 24, 2020

(30) Foreign Application Priority Data
Dec. 8, 2017 (JP) .............................. JP2017-236253

(51) Int. Cl.
*G05B 19/00* (2006.01)
*G05B 19/4155* (2006.01)
(Continued)

(52) U.S. Cl.
CPC ............ *G05B 19/4155* (2013.01); *G01L 3/08* (2013.01); *G01L 5/24* (2013.01); *G06T 7/70* (2017.01);
(Continued)

(58) Field of Classification Search
CPC ...... G05B 19/4155; G05B 2219/32423; G05B 2219/45031; G06T 7/70;
(Continued)

(56) References Cited

U.S. PATENT DOCUMENTS

2008/0177417 A1   7/2008  Kasuga et al.
2009/0308178 A1*  12/2009 Kushida .............. B25B 23/1425
                                                  73/862.23
(Continued)

FOREIGN PATENT DOCUMENTS

CN        102794732 A      11/2012
DE    202008018265 U1 *   8/2012    ............. B25B 23/14
(Continued)

OTHER PUBLICATIONS

Chinese Office Action, dated Oct. 27, 2021, by the China Patent Office for the corresponding Chinese Patent Application No. 201880079395.5.
(Continued)

*Primary Examiner* — Khai M Nguyen
(74) *Attorney, Agent, or Firm* — Greenblum & Bernstein, P.L.C.

(57) ABSTRACT

A tool is equipped with a torque sensor, suited for a tightening task of a fastening component of a device such as a fluid control system that requires a large number of
(Continued)

fastening components for assembly and has a narrow space for access to the fastening components, and capable of automatically detecting a tightening torque. The tool includes a torque sensor capable of detecting a tightening torque for tightening a fastening component acting on a bit. The torque sensor initiates measurement of the tightening torque when the tightening torque detected exceeds a set threshold value, completes measurement when the tightening torque detected falls below the set threshold value and a set time elapses, and outputs torque-related data formed on the basis of measurement data from measurement initiation to measurement completion and including a measurement time. The torque-related data includes a peak value of the measurement data.

3 Claims, 14 Drawing Sheets

(51) Int. Cl.
    *G06T 7/70*        (2017.01)
    *G01L 3/08*        (2006.01)
    *G01L 5/24*        (2006.01)
    *H04N 5/247*      (2006.01)

(52) U.S. Cl.
    CPC ... *H04N 5/247* (2013.01); *G05B 2219/32423* (2013.01); *G05B 2219/45031* (2013.01); *G06T 2207/30148* (2013.01); *G06T 2207/30204* (2013.01)

(58) Field of Classification Search
    CPC . G06T 2207/30148; G06T 2207/30204; G01L 3/08; G01L 5/24; H04N 5/247
    See application file for complete search history.

(56) References Cited

U.S. PATENT DOCUMENTS

| | | |
|---|---|---|
| 2009/0326699 A1 | 12/2009 | Coffland et al. |
| 2017/0197302 A1 | 7/2017 | Kobayashi |

FOREIGN PATENT DOCUMENTS

| | | | |
|---|---|---|---|
| JP | H8-155848 A | 6/1996 | |
| JP | 2006-320984 A | 11/2006 | |
| JP | 2007-003013 A | 1/2007 | |
| JP | 2008-181344 A | 8/2008 | |
| JP | 2010-042491 A | 2/2010 | |
| JP | 2013-000852 A | 1/2013 | |
| JP | 2013-132736 A | 7/2013 | |
| JP | 2013-188858 A | 9/2013 | |
| JP | 5305783 B2 * | 10/2013 | |
| JP | 2015-179304 A | 10/2015 | |
| JP | 2015179304 A * | 10/2015 | |
| JP | 2015-229210 A | 12/2015 | |
| JP | 2016-038716 A | 3/2016 | |
| KR | 10-2015-0057250 A | 5/2015 | |
| TW | M542541 U | 6/2017 | |
| WO | WO-2015185974 A1 * | 12/2015 | ........... B25B 13/463 |
| WO | 2017/149623 A1 | 9/2017 | |
| WO | WO-2018123433 A1 * | 7/2018 | ............ B25B 21/00 |

OTHER PUBLICATIONS

International Search Report, dated Mar. 26, 2019 by the Japan Patent Office (JPO), in International Application No. PCT/JP2018/044357.
Written Opinion, dated Mar. 26, 2019 by the Japan Patent Office (JPO), in International Application No. PCT/JP2018/044357.
Chinese Office Action, dated May 5, 2022, from the China Patent Office in the corresponding Chinese Patent Application.
Office Action, dated Aug. 31, 2021, by the Korea Patent Office for the corresponding Korean Patent Application No. 10-2020-7018111.

* cited by examiner

[fig.1]
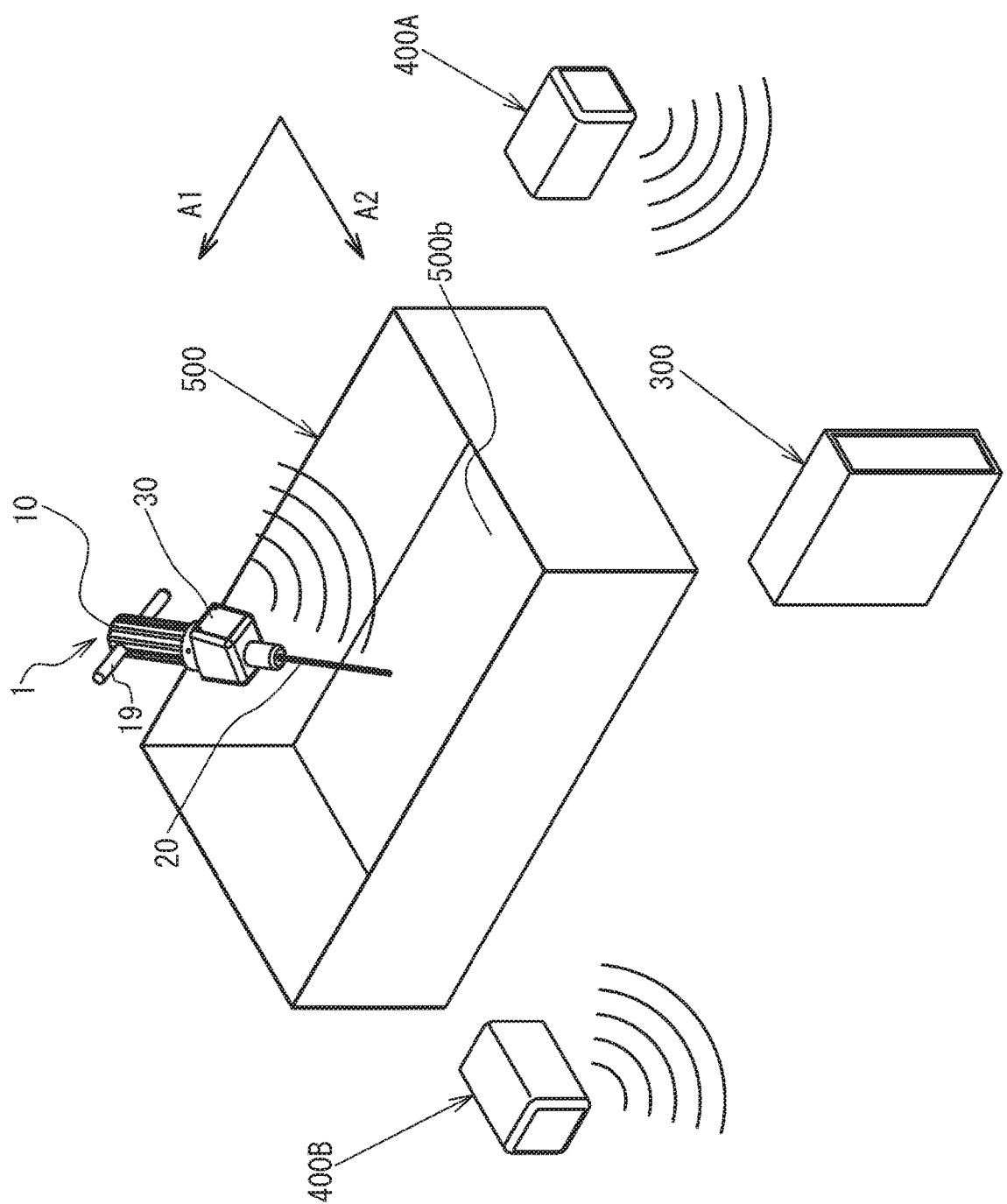

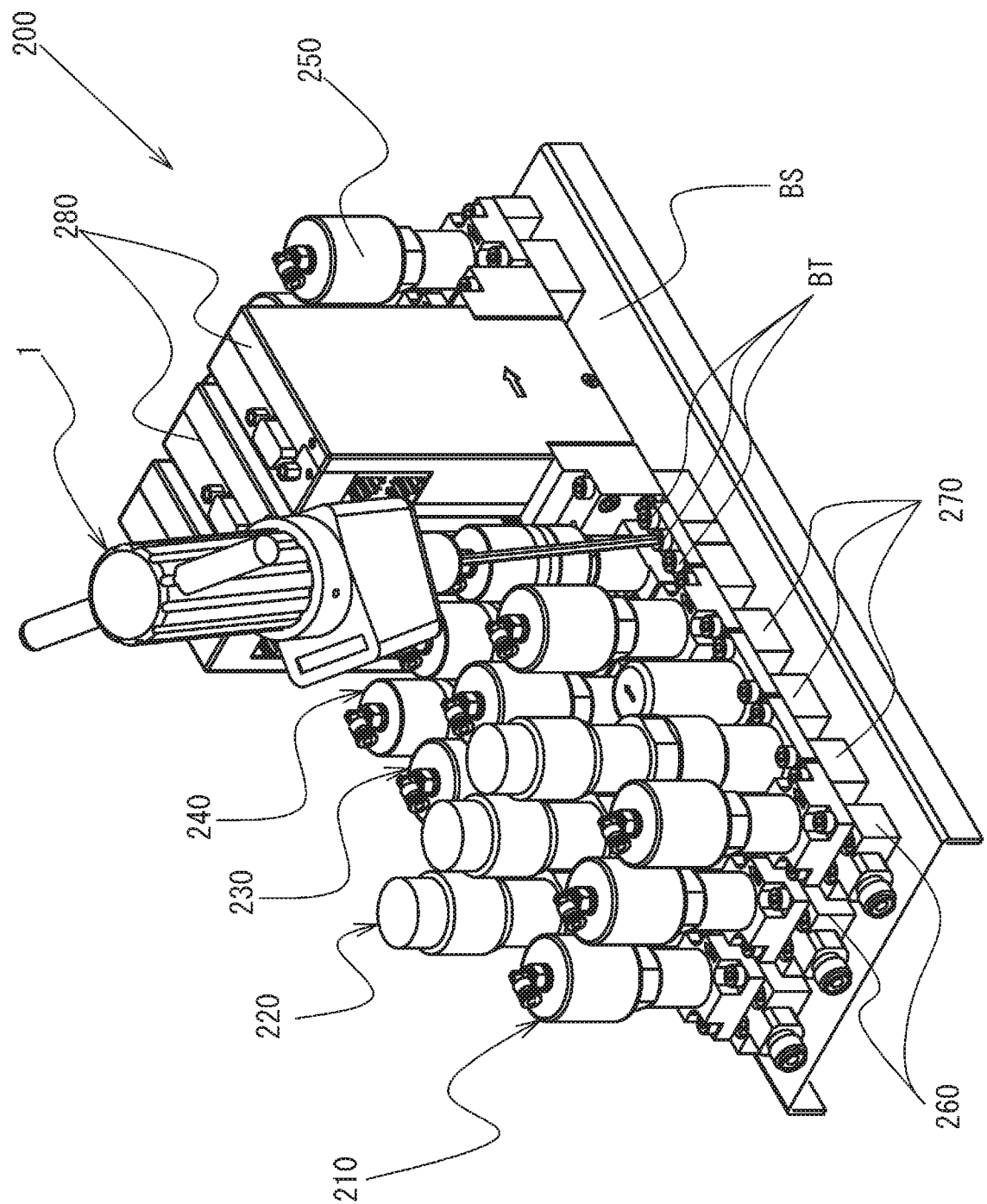
[fig.2]

[fig.3]
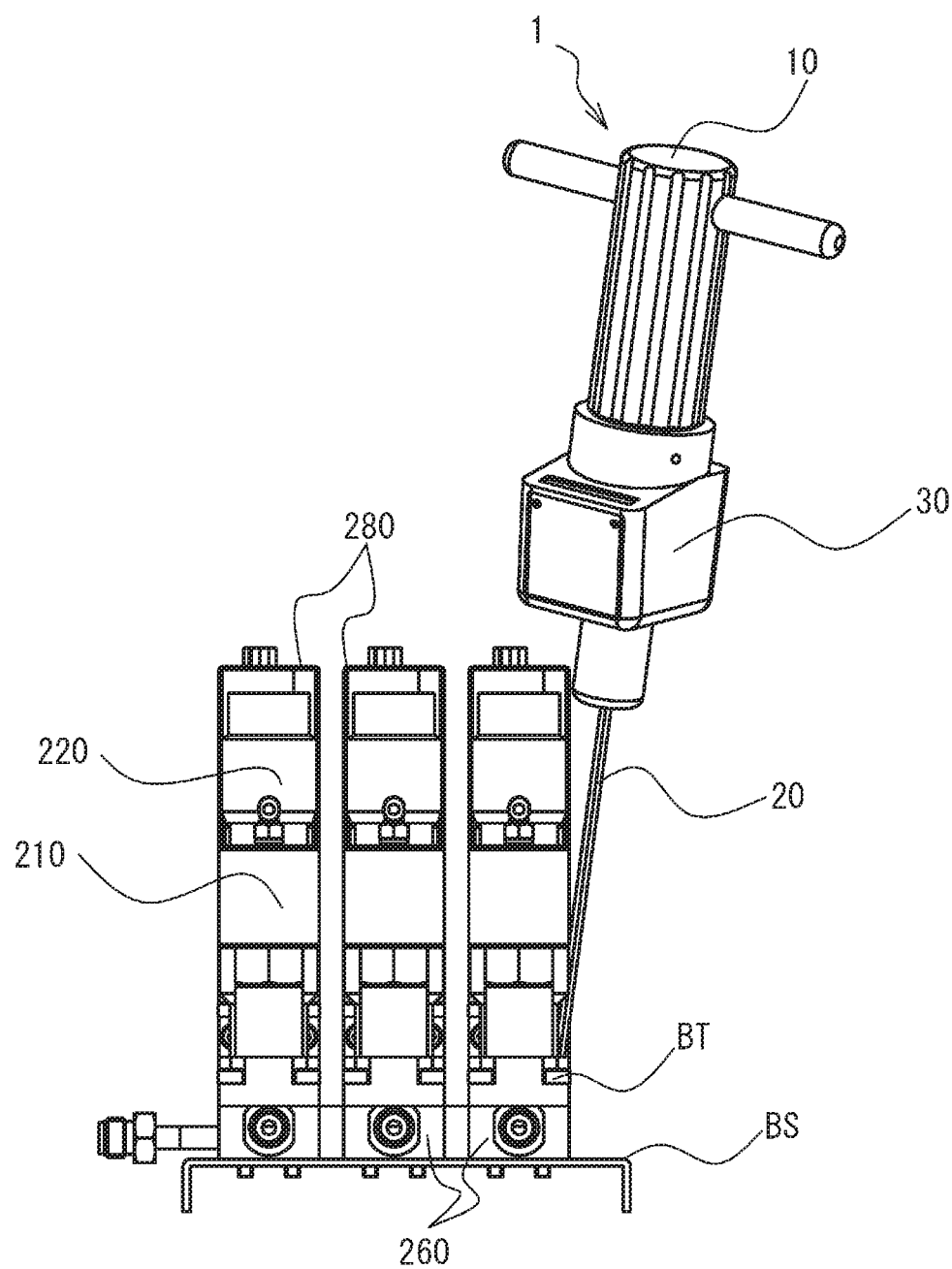

[fig.4A]
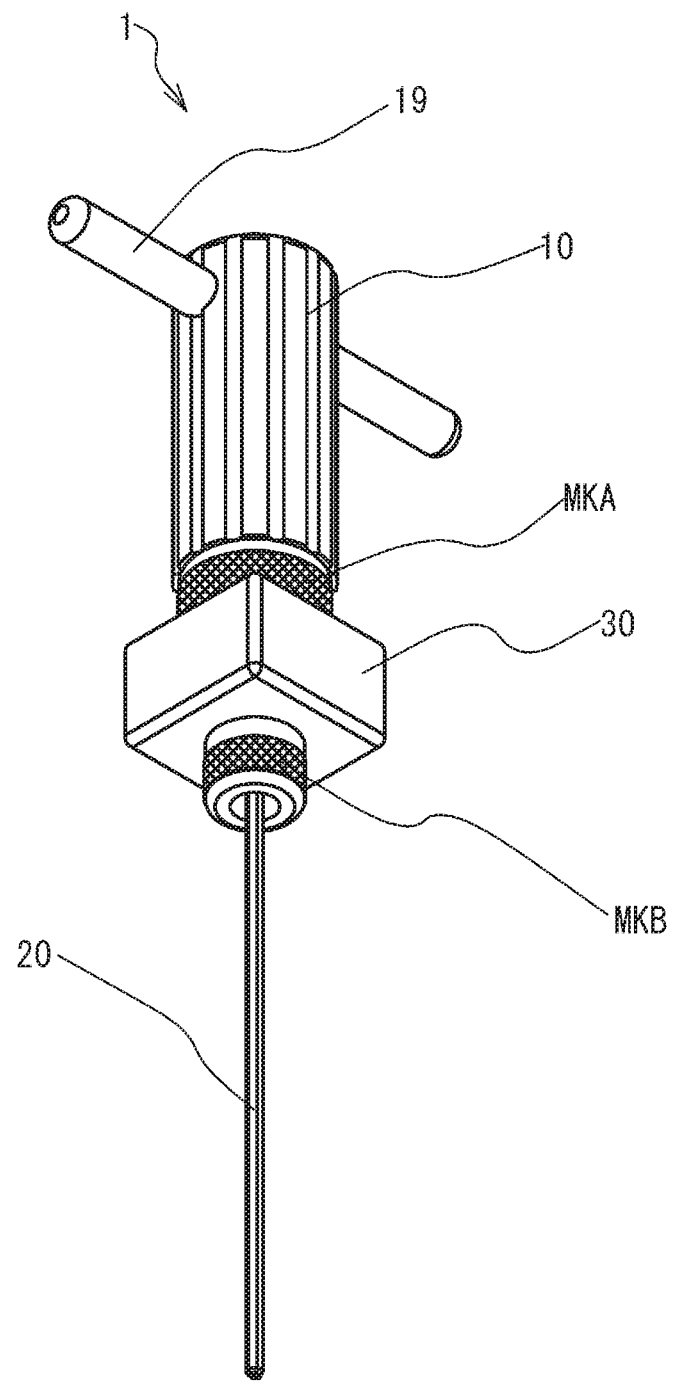

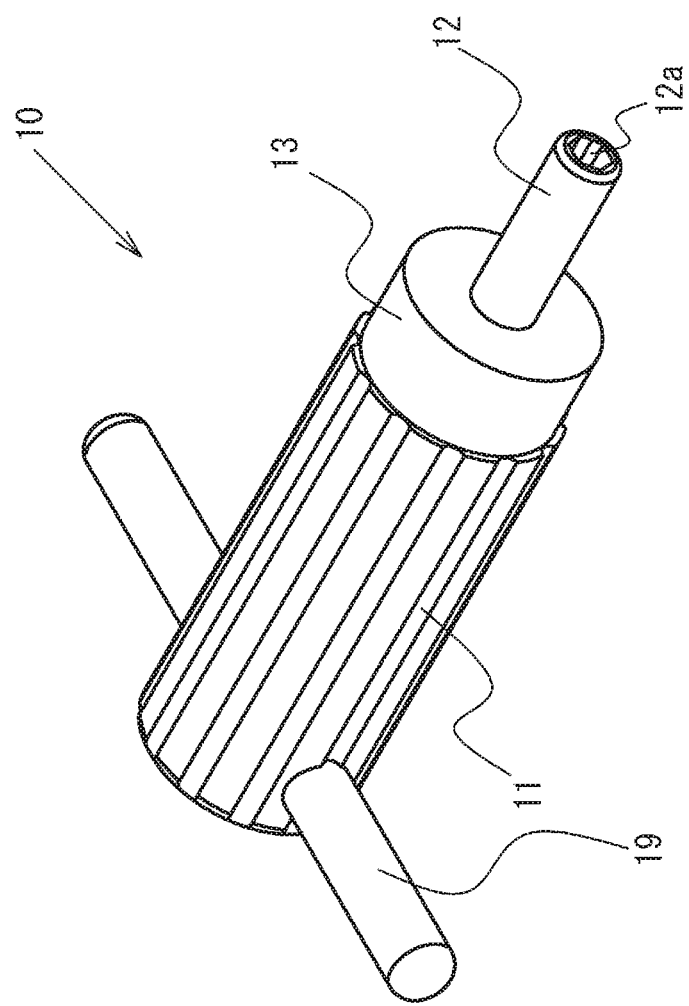
[fig. 4B]

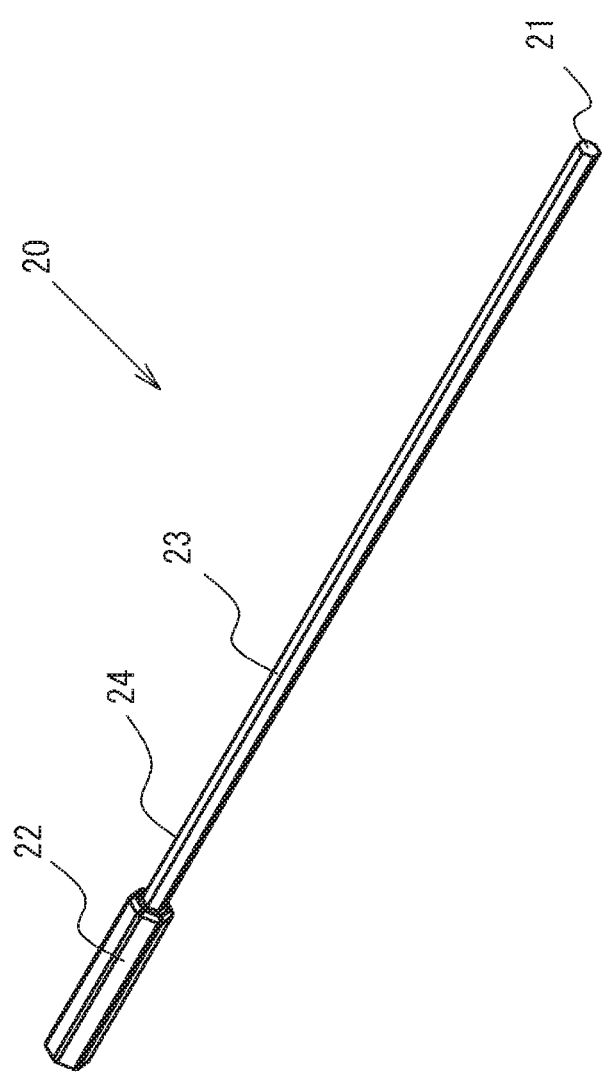
[fig.4C]

[fig.4D]
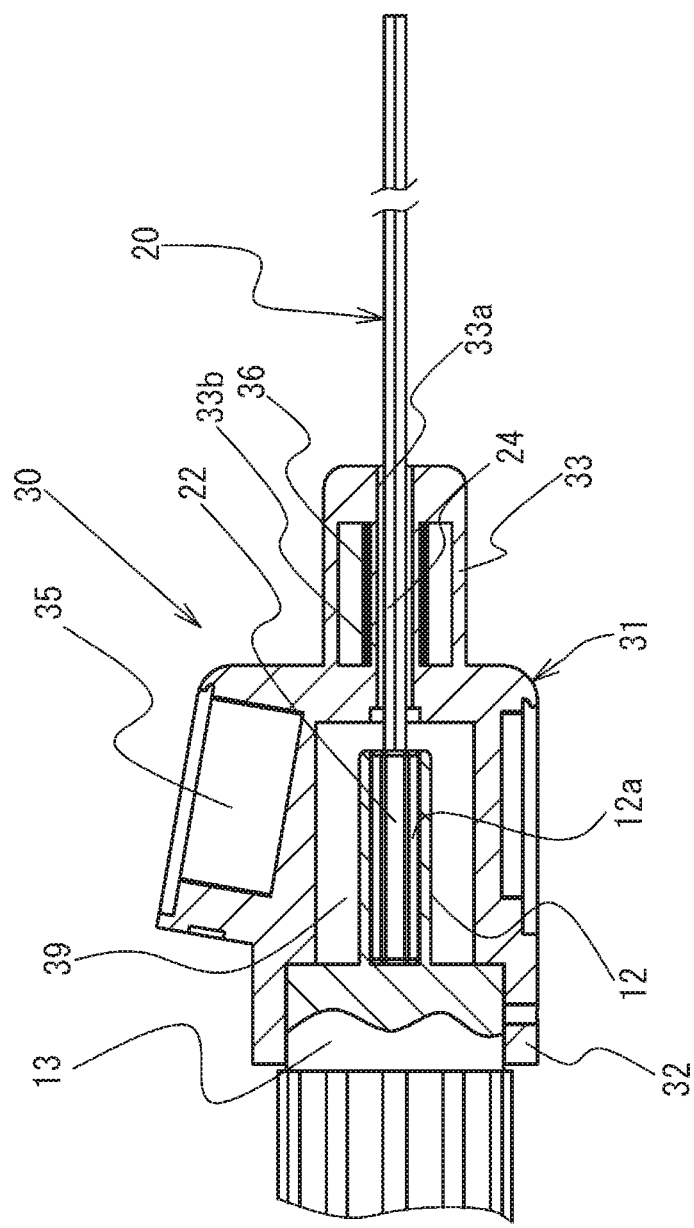

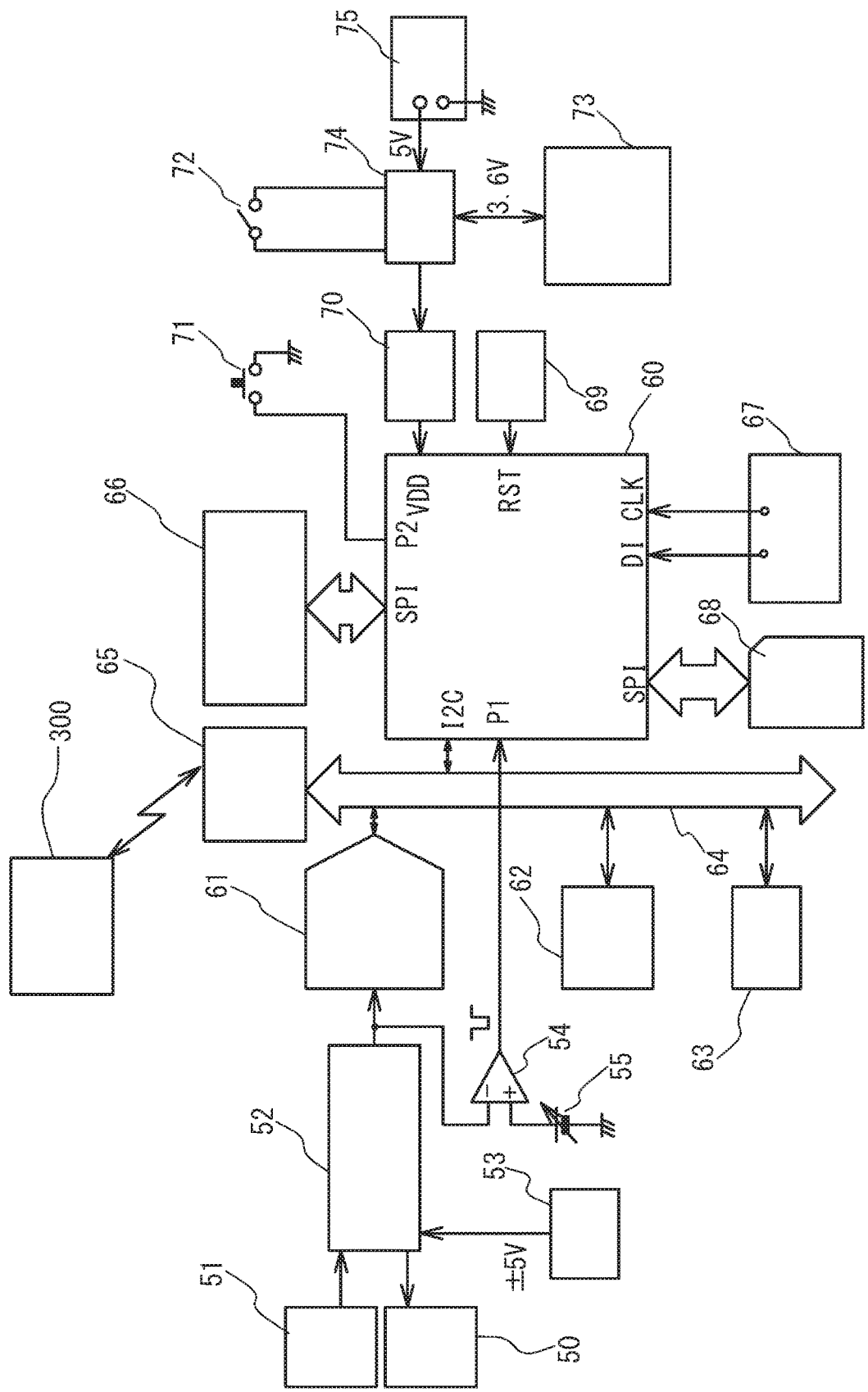
[fig.5A]

[fig.5B]
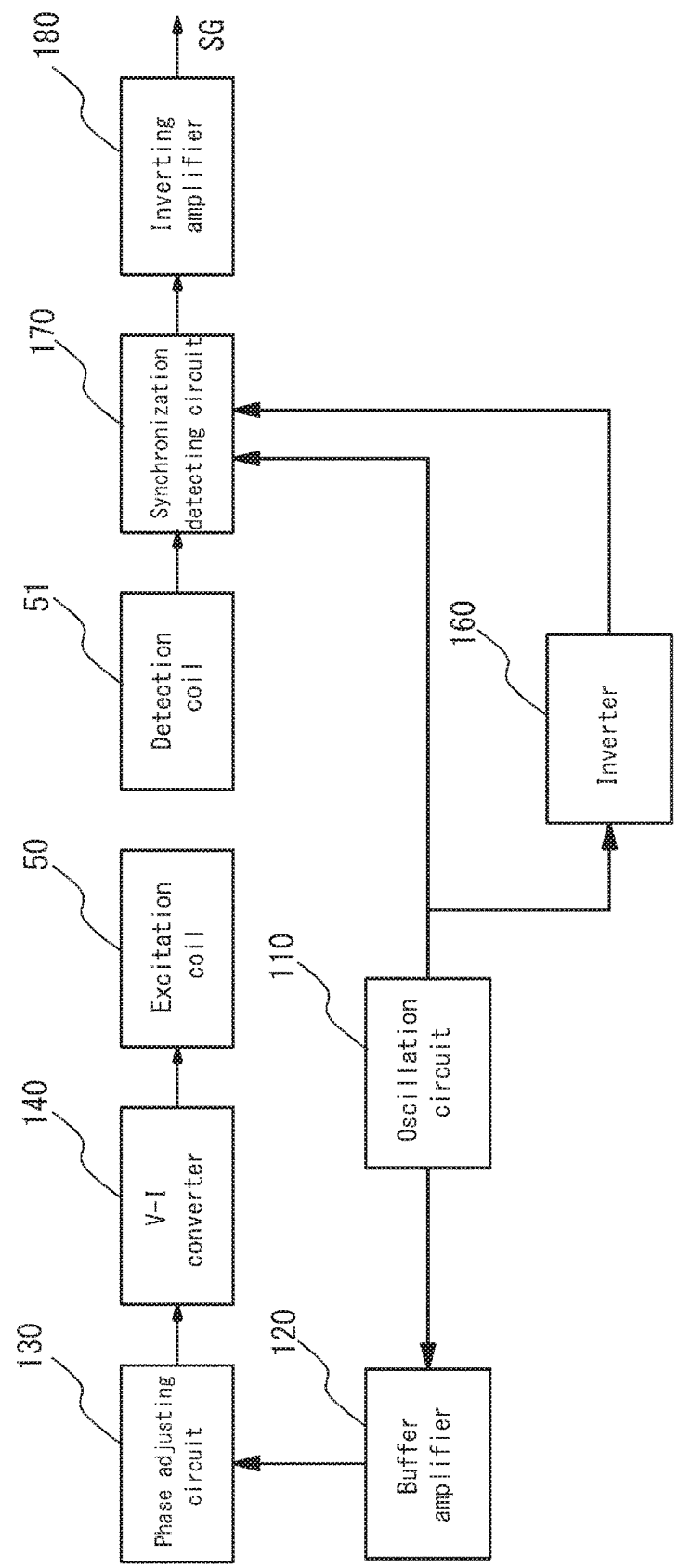

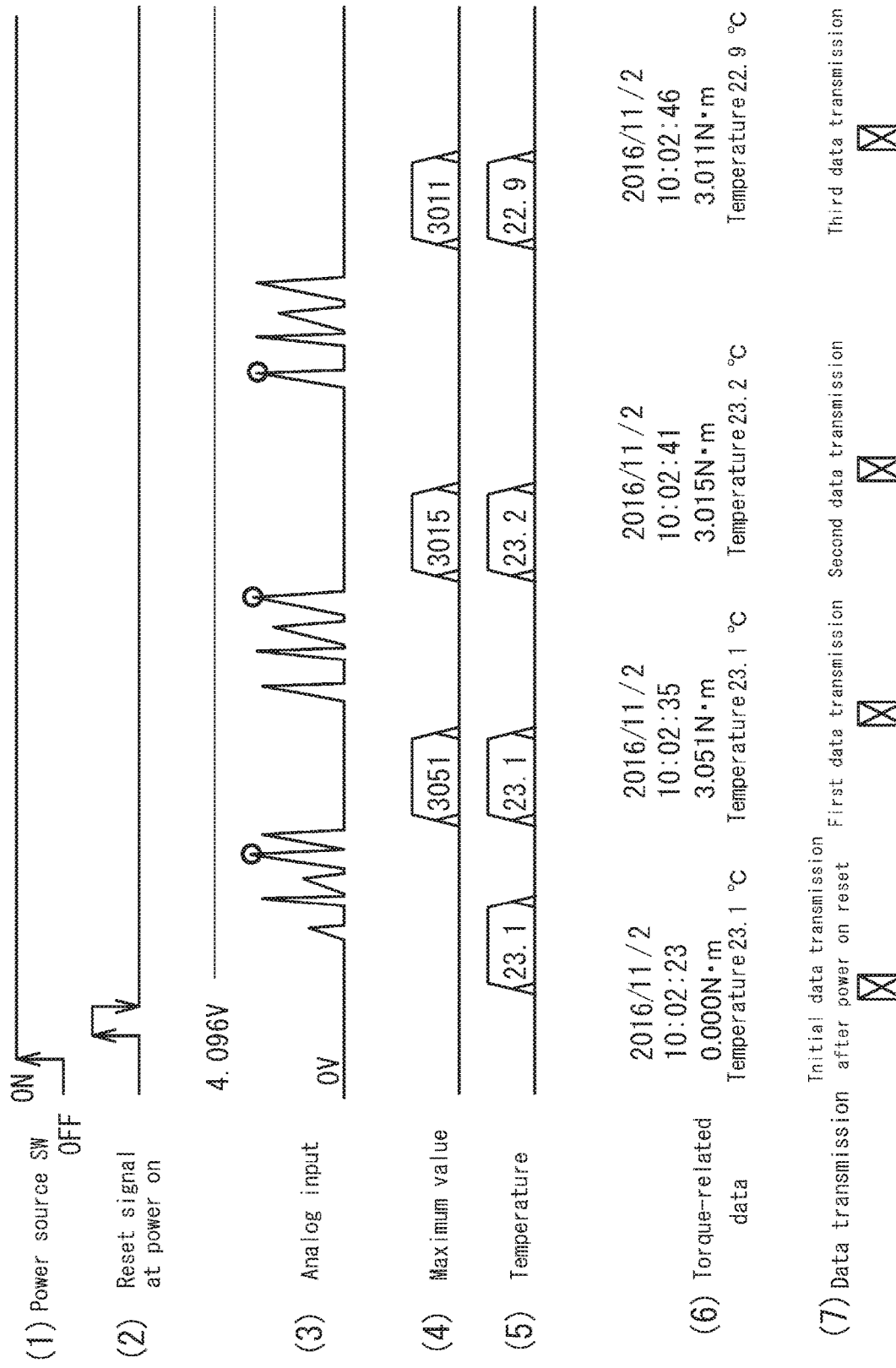

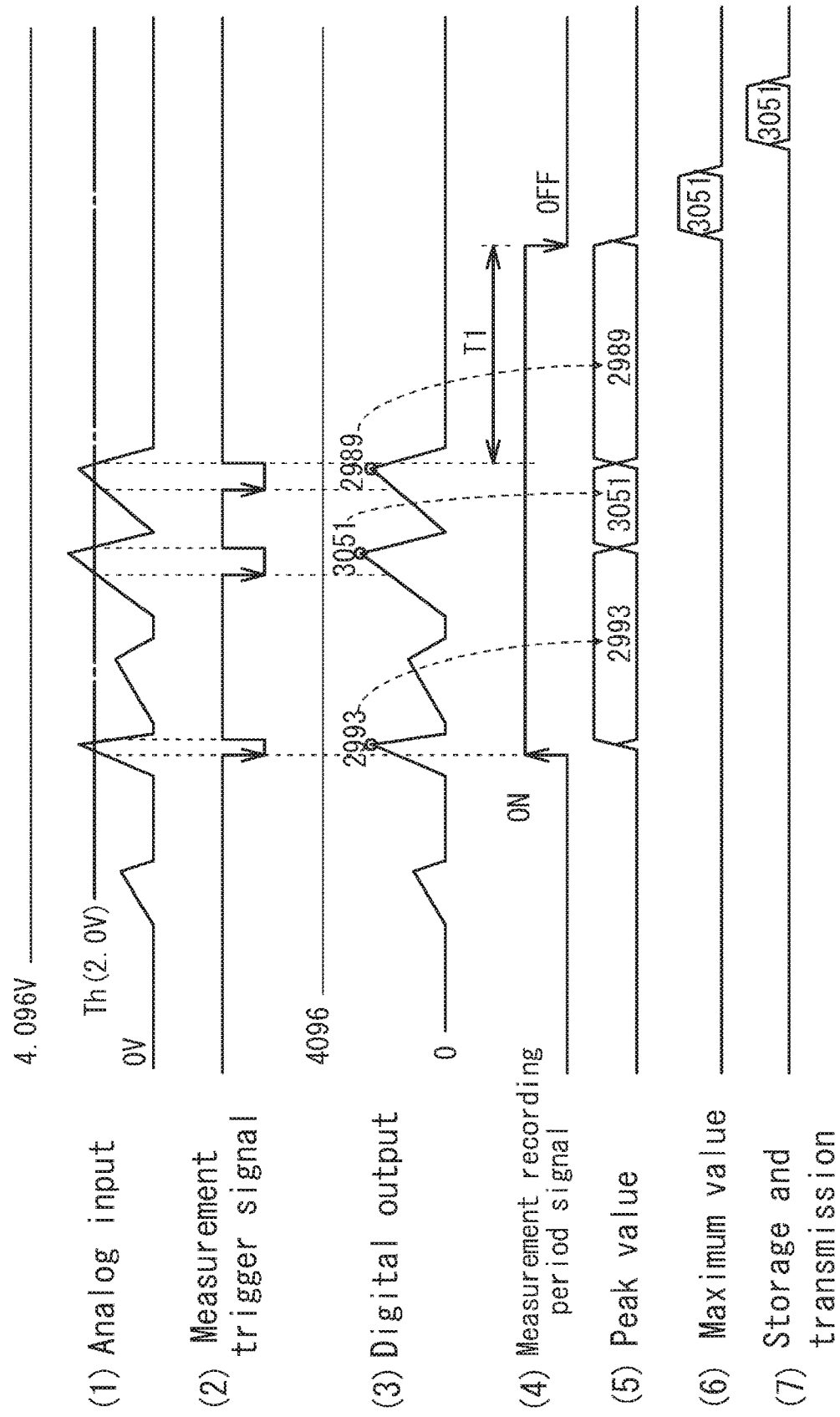

[fig.8]
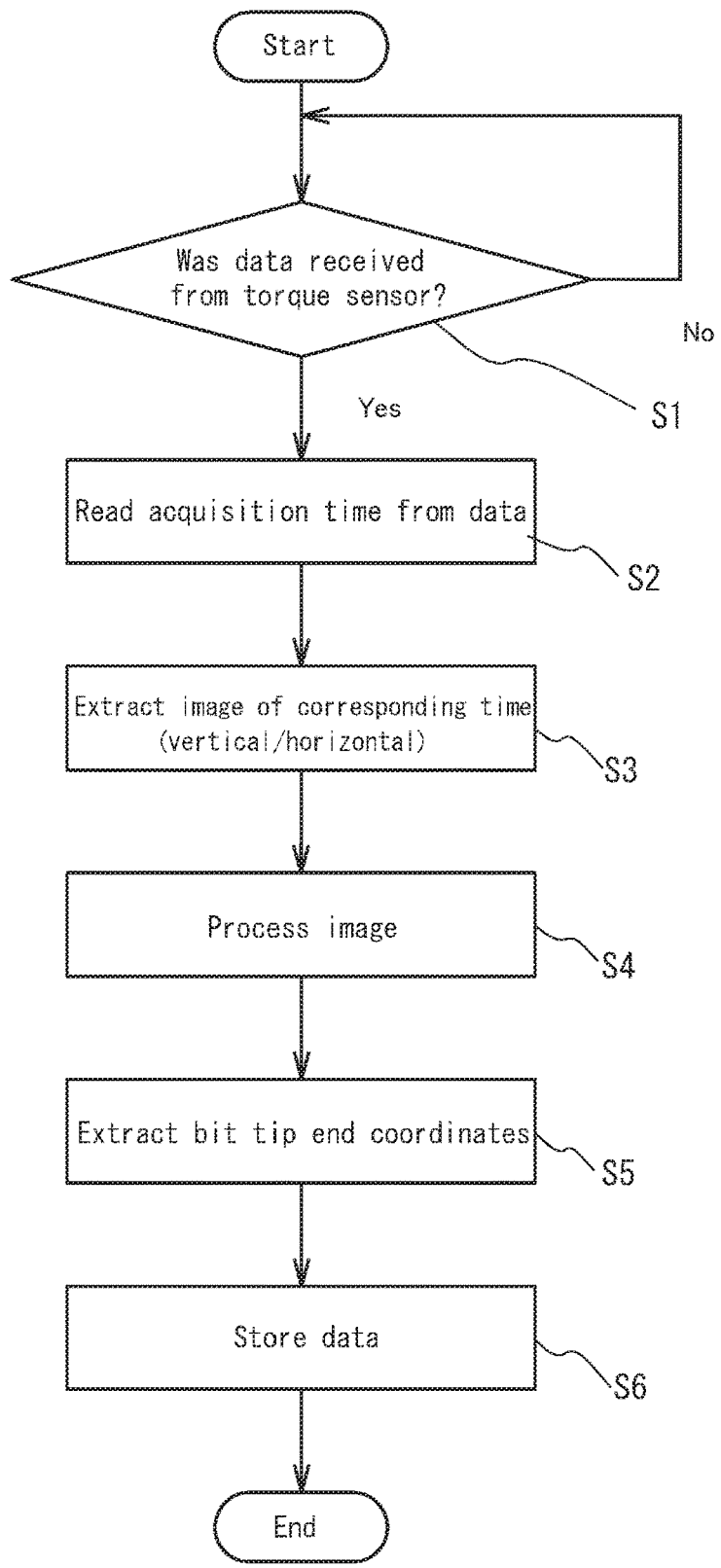

[fig.9]
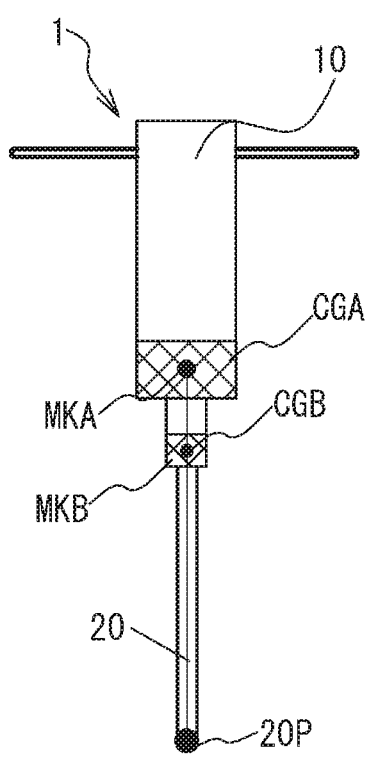

[fig.10]
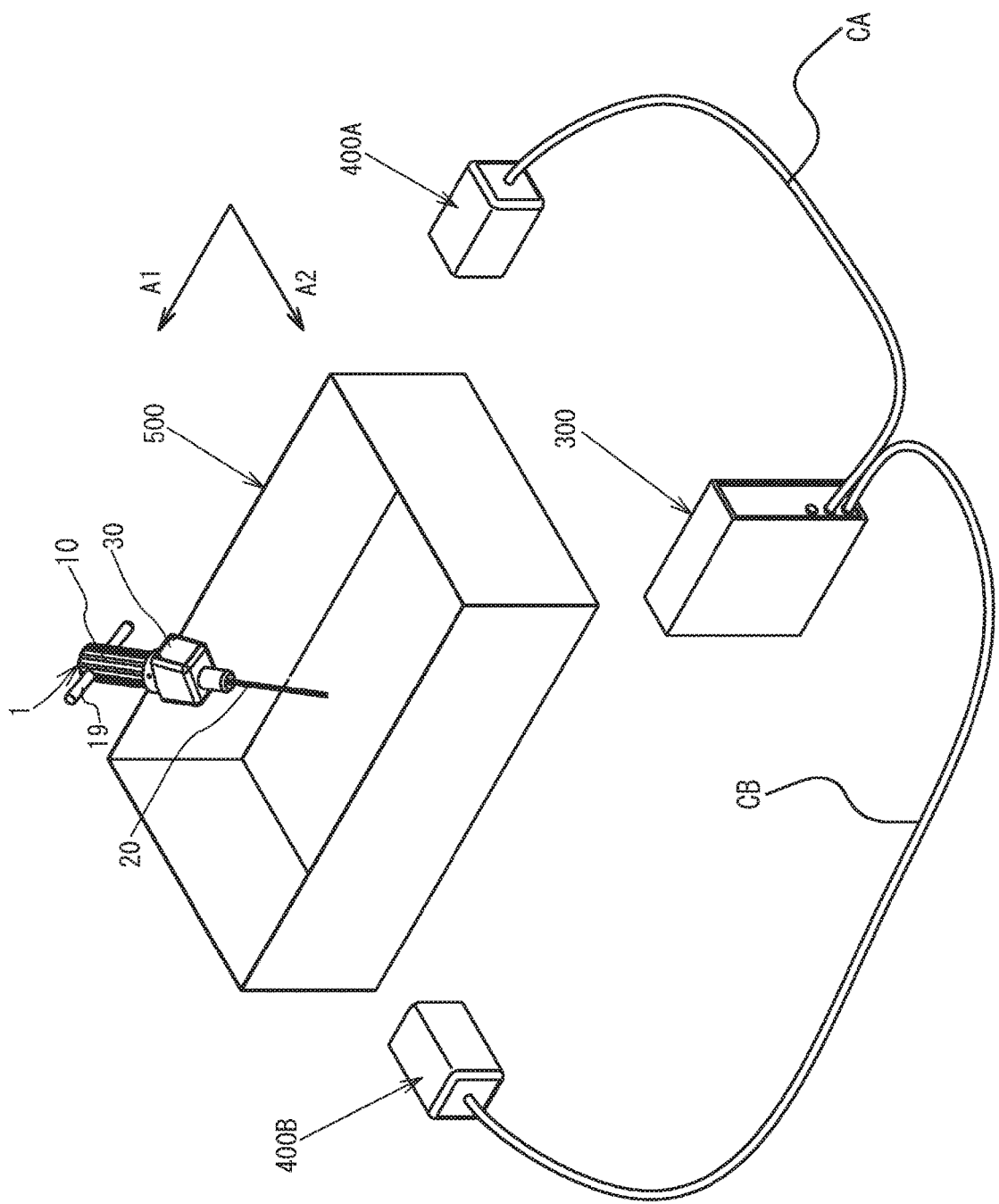

TOOL, TASK MANAGEMENT DEVICE, TASK MANAGEMENT METHOD, AND TASK MANAGEMENT SYSTEM

FIELD OF THE INVENTION

The present invention relates to a tool equipped with a torque sensor and used for a tightening task of fastening components of a device having a large number of fastening components such as bolts, and a task management device, a task management method, and a task management system for managing a tightening task performed by using this tool.

DESCRIPTION OF THE BACKGROUND ART

In various manufacturing processes such as a semiconductor manufacturing process, a fluid control system (for example, refer to Patent Document 1) in which various fluid devices, such as a switch valve, a regulator, and a mass flow controller, are integrated is used to supply an accurately measured process gas to a process chamber.

In an assembly process of a fluid control system such as described above, a great number of tightening tasks of fastening components, such as hexagon socket bolts, are required and high assembly quality is demanded.

PATENT DOCUMENTS

Patent Document 1: Japanese Laid-Open Patent Application No. 2007-003013
Patent Document 2: Japanese Laid-Open Patent Application No. 2013-188858
Patent Document 3: Japanese Laid-Open Patent Application No. 2015-229210
Patent Document 4: Japanese Laid-Open Patent Application No. 2013-852
Patent Document 5: Japanese Laid-Open Patent Application No. 2008-181344

SUMMARY OF THE INVENTION

Problems to be Solved by the Invention

Patent Document 2 discloses a technique in which a signal from a sensor such as an acceleration sensor, a gyro sensor, or a geomagnetic sensor provided to a torque wrench is utilized to automatically detect a position of a tightened fastening component and manage the tightening position.

Patent Document 3 discloses a technique in which an image of a location of a task performed by a tool is captured by an imaging device, and whether the task is properly performed is determined on the basis of this captured image data and data from a sensor such as a torque sensor added to the tool.

Patent Document 4 discloses a technique in which an imaging device is installed above a workpiece to detect, from imaging data, the presence or absence of a pre-registered identification mark given to a tightening tool when a tightening task using the tightening tool is implemented on the workpiece, thereby detecting whether the tightening task was implemented.

Patent Document 5 discloses a technique in which, in a manufacturing process of a product that includes a plurality of tasks performed by using a tool, a position where a task on the product was performed is identified. Specifically, when one such task is completed, a plurality of images are captured upon reception of a completion signal, task completion coordinates indicating a task completion position are detected from these images, task coordinates indicating a task position that is a position where the task is to be performed are acquired and, from among the task positions of each of the plurality of tasks, the task position corresponding to the task completion position is identified on the basis of the task completion coordinates and the task coordinates.

The fluid control system described above has been increasingly miniaturized and integrated, the tightening members such as bolts have been shortened, and the space between the fluid devices has been narrowed. Thus, the tightening task of a tightening member such as a bolt is performed by using a tool in which an elongated bit is mounted to a bit holding part provided to a grip. For example, a tightening task of a fastening component in a location accessible only through a narrow space between fluid devices is performed by inserting only the bit portion of the tool into the narrow space, engaging the bit tip end portion with the fastening component while appropriately adjusting a posture of the bit, and rotating the bit by operating the grip located in a position away from the fluid devices.

However, in order for such a tool to have the function of detecting a tightening position that is disclosed in Patent Document 2, it is necessary to mount a case incorporating various sensors, a central processing unit (CPU), and the like. Mounting a case incorporating various sensors, a CPU, and the like onto a tool composed of a grip and a bit is difficult and, even if the case is mounted onto the tool, the case becomes an obstacle and the operability of the tool is significantly reduced. In addition, mounting a large number of sensors increases tool manufacturing costs.

In the techniques of Patent Documents 3 and 4, it is difficult to reliably capture an image of the tip end portion of the bit inserted into the narrow space between the fluid devices and the tightening position, and a hand of an operator or the grip of the tool enters the imaging region during imaging, covering the task location and tightening position.

In Patent Document 5, while the task position can be identified, actual torque data resulting from screw tightening cannot be obtained. Further, a worker may perform re-tightening several times in a tightening task such as screw tightening, making it not easy to generate an appropriate completion signal. Furthermore, the time for tightening one screw is as short as several seconds and a space between one screw and an adjacent screw is small, making it not easy to identify task completion from only an image.

An object of the present invention is to provide a tool equipped with a torque sensor, suited for a tightening task of a fastening component of a device such as a fluid control system that requires a large number of fastening components for assembly and has a narrow space for access to the fastening components, and capable of automatically detecting a tightening torque.

Another object of the present invention is to provide a task management device, a task management method, and a task management system capable of accurately managing information of a position, a tightening torque, and the like for all fastening components in a tightening task performed by using the tool equipped with a torque sensor described above.

Means for Solving the Problems

A tool according to the present invention is a tool comprising a torque sensor capable of detecting a tightening torque for tightening a fastening component acting on a bit, the torque sensor initiating recording of measurement data of the tightening torque when the tightening torque detected exceeds a set threshold value, completing measurement when the tightening torque detected falls below the set threshold value and a set time elapses, and outputting torque-related data formed on the basis of measurement data from measurement initiation to measurement completion and including a measurement time.

Preferably, a configuration can be adopted in which the torque-related data includes a peak value of the measurement data, a configuration can be adopted in which the torque-related data includes date and time information from when the data is measured and temperature information when the data is measured, and a configuration can be adopted in which the tool comprises at least a first marker and a second marker for image processing.

A task management device according to the present invention is a task management device for managing a tightening task of tightening each of a plurality of fastening components included in a product by using the tool having the above-described configuration, which is configured to, when the torque-related data is received, extract and process from among a plurality of images of the tool captured from a plurality of viewpoints during a tightening task of one fastening component, a plurality of images corresponding to the measurement time included in the torque-related data, and detect an engagement position of the bit that engages with the one fastening component.

A task management method of the present invention is a task management method for managing a tightening task of tightening each of a plurality of fastening components included in a product by using the tool having the above-described configuration, and comprises the step of when the torque-related data is received, extracting and processing, from among a plurality of images of the tool captured from a plurality of viewpoints during a tightening task of one fastening component, a plurality of images corresponding to the measurement time included in the torque-related data, and detecting an engagement position of the bit that engages with the one fastening component.

A task management system of the present invention is a task management system for managing a tightening task of tightening each of a plurality of fastening components included in a product, and comprises a tool including a torque sensor capable of detecting a tightening torque for tightening a fastening component acting on a bit, and a first marker and a second marker for image processing, the torque sensor initiating recording of measurement data of the tightening torque when the tightening torque detected exceeds a set threshold value, completing measurement when the tightening torque detected falls below the set threshold value and a set time elapses, and outputting torque-related data formed on the basis of measurement data from measurement initiation to measurement completion, a first imaging device and a second imaging device that are disposed in predetermined positions relative to the product, and capture images of the tool that include at least the first marker and the second marker during the tightening task from mutually different viewpoints, a storage device that stores the images captured by the first imaging device and the second imaging device, and a processing device that, when the torque-related data is received, extracts and processes, from among a plurality of images of the tool captured from a plurality of viewpoints during a tightening task of one fastening component and stored in the storage device, a plurality of images corresponding to the measurement time included in the torque-related data, and detects an engagement position of the bit that engages with the one fastening component.

Effect of the Invention

According to the present invention, a tool equipped with a torque sensor, suited for a tightening task of a fastening component of a device such as a fluid control system that has a narrow space for access to the fastening components, and capable of automatically detecting a tightening torque can be obtained.

According to the present invention, information of a position, a tightening torque, and the like for all fastening components in a device such as a fluid control system can be accurately managed.

BRIEF DESCRIPTION OF THE DRAWINGS

FIG. 1 is an external perspective view of a task management system according to an embodiment of the present invention.

FIG. 2 is an external perspective view illustrating an example of a fluid control system.

FIG. 3 is a side view of the fluid control system in FIG. 2.

FIG. 4A is an external perspective view of a tool according to an embodiment of the present invention.

FIG. 4B is an external perspective view of a grip part.

FIG. 4C is an external perspective view of a bit.

FIG. 4D is a longitudinal sectional view of a torque sensor portion of the tool.

FIG. 5A is a circuit diagram of the torque sensor.

FIG. 5B is a functional block diagram of an analog circuit portion of the torque sensor.

FIG. 6 is a timing chart showing an example of processing of the torque sensor when a plurality of tightening tasks are implemented.

FIG. 7 is a timing chart showing an example of various signals of the torque sensor in one tightening task.

FIG. 8 is a flowchart showing an example of processing of a processing device.

FIG. 9 is an explanatory view of a method for detecting a bit tip end position by image processing.

FIG. 10 is an external perspective view of a task management system according to another embodiment of the present invention.

DESCRIPTION OF THE PREFERRED EMBODIMENTS

Embodiments of the present invention are described below with reference to the drawings. It should be noted that, in this specification and the drawings, components having substantially the same function are denoted using the same reference numeral, and duplicate descriptions thereof are omitted.

FIG. 1 illustrates a task management system according to an embodiment of the present invention. This system includes a driver 1 serving as a tool, a personal computer (hereinafter, referred to as a PC) 300 serving as a processing device, and cameras 400A, 400B serving as imaging devices. In FIG. 1, while an interior of a gas box 500, which is a product, is omitted, a fluid control system 200 illustrated in FIG. 2 and FIG. 3 is installed on a bottom surface 500b thereof. That is, an assembly task is performed with the fluid control system 200 housed in the gas box 500. It should be noted that an arrow A1 in FIG. 1 indicates a horizontal direction within a horizontal plane, and an arrow A2 indicates a vertical direction within a horizontal plane.

The fluid control system 200 illustrated in FIGS. 2 and 3 is used for supplying various gases to a reactor of a semiconductor manufacturing system or the like and, on a base sheet metal BS, a plurality (three rows in the drawing) of fluid control assemblies configured by various fluid devices 210, 220, 230, 240, 280, 250 composed of automatic valves and mass flow controllers respectively disposed in a longitudinal direction are arranged in parallel.

A plurality of joint blocks 260, 270 provided on the base sheet metal BS include flow paths that connect the various fluid devices. Bodies of the fluid devices and the joint blocks 260, 270 are coupled by hexagon socket bolts BT serving as tightening components.

The driver 1 is used for a tightening task of the hexagon socket bolt BT. When various fluid devices are integrated and the hexagon socket bolt BT is tightened, the driver 1 may tighten the hexagon socket bolt BT while inclined so that a bit of the driver 1 does not interfere with the fluid devices. It is not easy to implement such a task with an accurate tightening torque for a large number of hexagon socket bolts BT.

Returning to FIG. 1, the camera 400A has a viewpoint in the horizontal direction A1, and is disposed in a position allowing capture of an image of a marker provided on the tool 1, as described later. The camera 400B has a viewpoint in the vertical direction A2, and is disposed in a position allowing capture of an image of a marker provided on the tool 1, as described later. The cameras 400A, 400B can capture an image at a predetermined frame rate, and the captured image data is transmitted to the PC 300 as a wireless signal and stored. The cameras 400A, 400B are installed outside the gas box 500 and thus, during the tightening task of the hexagon socket bolt BT of the driver 1, a tip end position of the bit of the driver 1 and the hexagon socket bolt BT may not be in the fields of view of the cameras 400A, 400B.

FIGS. 4A to 4D illustrate a structure of the driver 1.

The driver 1 includes a grip 10, a bit 20, and a torque sensor 30. The driver 1 is used to fasten a hexagon socket bolt (fastening component) and is used within a range of a maximum tightening torque of 10 N·m or less, but is not necessarily limited thereto.

The fastening component used is a hexagon socket bolt, a hexagon head bolt, a cross-recessed screw, or the like, but is not limited thereto.

The grip 10, as illustrated in FIG. 4B, is a columnar member composed of a material such as a resin, and includes a main body part 11 with a plurality of non-slip grooves formed on an outer peripheral surface thereof, a bit holding part 12 having a cylindrical shape and formed on a tip end portion, and a sensor mounting part 13 that is formed between the main body part 11 and the bit holding part 12 and detachably mounts the torque sensor 30. A holding hole 12a composed of a blind hole having a regular hexagonal cross section is formed in the bit holding part 12, and the bit 20 is inserted into and held by this holding hole 12a. An auxiliary bar 19 is provided orthogonal to the grip 10. By providing the auxiliary bar 19 to the grip 10, it is possible to manually generate a larger tightening and loosening torque.

The bit 20, as illustrated in FIG. 4C, includes a base end portion 22 that has a regular hexagonal cross section and is inserted into and held by the bit holding part 12 of the grip 10 described above, a tip end portion 21 opposite to the base end portion 22, and a shaft part 23 extending between the base end portion 22 and the tip end portion 21. The hexagonal cross sections of the tip end portion 21 and the shaft part 23 are formed to the same dimensions. Cross-sectional areas of the tip end portion 21 and the shaft part 23 are smaller than that of the base end portion 22. The tip end portion 21 engages with the hexagonal hole of the hexagon socket bolt. A portion of the shaft part 23 near the base end portion 22 is a monitored part 24 to be detected by the torque sensor 30.

The bit 20 is specifically formed of an alloy steel such as a carbon steel, nickel-chromium-molybdenum steel, and chromium-vanadium steel.

The monitored part 24 is formed of a magnetostrictive material, and is plated with, for example, Ni (40%)-Fe (60%) in order to increase detection sensitivity.

With respect to the dimensions of the bit 20, for example, a diameter of a circle inscribed in a cross section of the base end portion 22 is 10 mm or less, a diameter of a circle inscribed in a cross section of the shaft part 23 is about 4 mm, and a total length is about 200 mm, but these dimensions are not limited thereto and are appropriately selected in consideration of workability and operability.

In the bit 20, the shaft part 23 and the monitored part 24 may be formed integrally or may be divided.

The torque sensor 30, as illustrated in FIG. 4D, includes a case part 31, a mounting part 32, a detecting part 33, and a circuit housing part 35.

The detecting part 33 includes a through-hole 33a formed in a central portion thereof, and the bit 20 penetrates through this through-hole 33a In an interior of the detecting part 33, a coil holding part 33b having a cylindrical shape is formed so as to define a portion of the through-hole 33a, and a coil 36 for excitation and detection is provided on an outer peripheral surface of the coil holding part 33b. An outer periphery of the monitored part 24 of the bit 20 penetrating the detecting part 33 is surrounded by the coil 36.

The case part 31, the mounting part 32, and the detecting part 33 are integrally formed of a resin material, and a cavity 39 is formed in an interior of the case part 31. The cavity 39 is capable of housing the bit holding part 12 of the grip 10 through the mounting part 32.

The mounting part 32 formed into a cylindrical shape is fitted with the sensor mounting part 13 of the grip 10 at an inner periphery thereof, and fixed to the sensor mounting part 13 by a screw member (not illustrated).

The circuit housing part 35, as described later, houses hardware configured by a microcomputer, a memory, a battery, an external input/output circuit, a communication circuit, various circuits for torque detection, and the like, and operates according to required software stored in the memory.

The driver 1 allows the torque sensor 30 to be attached after the bit 20 is mounted to the grip 10. Thus, given that the grip 10 and the bit 20 are general-purpose tools conventionally used, by post-attachment of the torque sensor 30, it is possible to detect the torque acting on the bit 20 without impairing the workability or operability of the tools.

It should be noted that while this embodiment illustrates a case where the torque sensor 30 can be post-attached, a configuration in which the torque sensor 30 is attached to the grip 10 in advance and the bit 20 is subsequently mounted to the grip 10 can also be adopted.

FIG. 5A is a circuit diagram of the torque sensor 30.

In FIG. 5A, 50 denotes an excitation coil, 51 denotes a detection coil, 52 denotes an analog circuit that outputs a voltage proportional to torque, 53 denotes a DC/DC converter, 54 denotes a comparator, and 55 denotes a reference voltage setting circuit. 60 denotes a microcomputer, 61 denotes an analog-digital converter (hereinafter referred to as an ADC), 62 denotes a temperature sensor. 63 denotes a real time clock. 64 denotes a serial bus, 65 denotes a communication module, 66 denotes a read-only memory (ROM), 67 denotes a data input terminal, 68 denote a memory card, 69 denotes a reset integrated circuit (IC), 70 denotes a DC/DC converter, 71 denotes a calibration switch, 72 denotes a power switch, 73 denotes a battery, 74 denotes a charging control circuit, and 75 denotes a charging connector.

Here, FIG. 5B illustrates a functional block diagram of the excitation coil 50, the detection coil 51, and the analog circuit portion of the analog circuit 52 in FIG. 5A.

The torque sensor 30 includes an oscillation circuit 110, a buffer amplifier 120, a phase adjusting circuit 130, a voltage to current (V-I) converter 140, an inverter 160, a synchronization detecting circuit 170, and an inverting amplifier 180.

(Excitation Side)

The oscillation circuit 110 generates a reference frequency signal (for example, 100 kHz) that excites the excitation coil 50.

A signal is output from the oscillation circuit 110 to the excitation-side circuit as a sine wave, but is output to the phase adjusting circuit 130 via the buffer amplifier 120 in order to stably operate the oscillation circuit 110.

The phase adjusting circuit 130 adjusts the phase of a waveform and outputs the result to the V-I converter 140.

The V-I converter 140 converts an input voltage into current and outputs the current to the excitation coil 50.

(Detection Side)

The detection coil 51 outputs an induced voltage produced by a reverse magnetostrictive effect to the synchronization detecting circuit 170.

A square wave is output from the oscillation circuit 110 to the detection side as a reference signal. A frequency of this square wave is the same as that of the sine wave output to the excitation side. The output square wave is branched into two, one of which is output to the synchronization detecting circuit 170 as is, and the other of which is inverted in phase by the inverter 160 and output to the synchronization detecting circuit 170.

The synchronization detecting circuit 170 synchronously detects the induced voltage from the detection coil 51 with reference to the reference signal and outputs the induced voltage to the inverting amplifier 180.

The inverting amplifier 180 averages the output from the synchronization detecting circuit 170, performs offset adjustment and gain adjustment, and outputs an analog torque signal SG to the ADC 61. The synchronization detecting circuit 170 and the inverting amplifier 180 constitute the analog circuit 52 described above.

As described above, in the torque sensor 30, a change in the torque acting on the monitored part of the bit 20 is detected by the excitation coil 50 and the detection coil 51 as a change in a magnetic permeability of the magnetostrictive material forming the bit 20.

To measure the torque with which the fastening component is tightened by the bit 20, the torque acting on the bit need only be detected.

While the reverse magnetostrictive effect is utilized to detect the torque acting on the bit, it is necessary to convert a change in magnetic permeability of a shaft (monitored part) surface due to the applied torque into an impedance change of a solenoid coil wound around the shaft (monitored part), and detect the torque as an unbalanced voltage of a bridge circuit.

A relationship between a stress (strain) acting on the surface of the shaft (monitored part) and the diameter of the shaft (monitored part) is expressed by the following equation.

$$\sigma = 16T/(\pi D^3)$$

Here, $\sigma$ is the stress (strain) on the surface of the shaft (monitored part), T is the torque acting on the shaft (monitored part), and D is the diameter of the shaft (monitored part).

That is, when the same torque is applied to bits having different diameters of the shaft (monitored part), the stress (strain) on the surface of the shaft (monitored part) increases significantly for bits having a smaller diameter of the shaft (monitored part).

The stress (strain) on the surface of the shaft (monitored part) changes the magnetic permeability of the surface of the shaft (monitored part).

While a change in magnetic permeability occurs by orientations of micromagnets configured on an atomic scale changing in response to a force from the outside, a change no longer occurs (saturated state) when the orientations of the micromagnets are completely aligned.

To precisely detect the torque applied to the bit (shaft), the change in magnetic permeability is preferably linear within a range of the applied torque.

The microcomputer 60 transmits and receives various digital data to and from the ADC 61, the temperature sensor 62, the real time clock 63, and the communication module 65 via the serial bus 64.

The communication module 65 transmits and receives data to and from the PC.

The ROM 66 stores correction value data and calibration data so that the microcomputer 60 can read the data.

The data input terminal 67 is provided for inputting a program or a clock signal to the microcomputer 60.

An analog torque signal is input to one input terminal of the comparator 54, a reference voltage (threshold value) is input from the reference voltage setting circuit 55 to the other input terminal, and when the torque signal exceeds the reference voltage, a measurement trigger signal is output to a P1 terminal of the microcomputer 60 as described later.

Next, the action of the circuit of the torque sensor 30 will be described with reference to FIG. 6 and FIG. 7. It should be noted that FIG. 6 is a timing chart showing the operation of the torque sensor 30 when a plurality of the bolts BT are sequentially tightened, and FIG. 7 is a timing chart showing the operation of the torque sensor 30 in the initial torque measurement of FIG. 6 in more detail.

The ADC 61 described above is configured by, for example, 12 bits, and can execute output within the range of 0 to 4.096 V, given 1 mv as 1 bit. In the present embodiment, a set threshold value Th is initially set to 2.0 V by the reference voltage setting circuit 55, for example.

When the power switch 72 illustrated in FIG. 5A is turned on (in a conduction state) as shown in (1) of FIG. 6, a reset signal is input from the reset IC 69 to the microcomputer 60 as shown in (2) of FIG. 6.

When one of the hexagon socket bolts BT of the fluid control system 200 is tightened using the tool 1 and the voltage of the torque signal (analog input) exceeds the set threshold value Th ((1) in FIG. 7), a measurement trigger signal is generated from the comparator 54 and input to the P1 terminal of the microcomputer 60.

In the microcomputer 60, when the measurement trigger signal is input to the P1 terminal, a measurement recording period signal ((4) in FIG. 7) is turned on. When the measurement recording period signal is turned on, the microcomputer 60 starts recording (sampling) the digital output ((3) in FIG. 7) of the ADC 61 of the torque signal.

The microcomputer 60 detects the read digital output and stores the data ((5) in FIG. 7).

When the analog input falls below the set threshold value Th, the measurement trigger signal is turned off ((2) in FIG. 7), and the recording of the digital output of the ADC 61 of the torque signal is stopped. When the analog input falls below the set threshold value Th and a set time T1 (for example, 0.5 seconds) set in advance elapses, the measurement recording period signal is turned off ((4) in FIG. 7). This completes the measurement of the tightening torque of one bolt BT.

In the example of FIG. 7, three peak values of the digital output are detected as 2993, 3051, and 2989. Then, the microcomputer 60 detects the maximum value (3051) of the three peak values ((6) in FIG. 7). In the present embodiment, the maximum value of the peak values is set as a tightening completion torque of the torque sensor 30.

Next, as described later, torque-related information including the maximum value of the torque is formed, and the torque-related information including this maximum value is stored in the memory card 68 and transmitted to the PC 300 through the communication module 65.

Returning to FIG. 6, the maximum value of the torque signal is detected for each tightening task ((3) and (4) in FIG. 6), the temperature at the time of measurement of each torque signal is detected ((5) in FIG. 6), and torque-related data is formed as shown in ((7) of FIG. 6). Specifically, the torque-related data includes a measurement time (measurement date and time), a value obtained by converting the maximum value (peak value) of the torque signal into an actual torque value, and a temperature at the time of measurement. In the torque-related data, the data of the torque value is zero at power on, 3.051 N·m the first time, 3.015 N·m the second time, and 3.011 N·m the third time.

Next, an example of the processing in the PC 300 will be described with reference to FIG. 8.

The PC 300 continually monitors whether torque-related data has been received from the torque sensor 30 (step S1). When the torque-related data has been received, the PC 300 reads the measurement time (date and time) at which the torque was measured from the torque-related data (step S2).

The PC 300 includes a frame buffer for recording images from the cameras 400A, 400B, and images of the tightening task are stored in the PC 300 as the task progresses. The image data stored in the PC 300 is traced back, and the image data respectively captured by the cameras 400A, 400B corresponding to the time read in step S2 is extracted. That is, these two images are images of the tool at the time of tightening completion of the bolt BT. This image data is processed, centers of gravity CGA, CGB of the images of a marker MKA and a marker MKB provided on the tool 1 are detected, and tip end coordinates 20P of the bit 20 exist on a straight line connecting the centers of gravity CGA, CGB, as illustrated in FIG. 9. Accordingly, the tip end coordinates of the bit 20 are detected (step S5). It should be noted that, in the present embodiment, the marker MKA and the marker MKB are green, which is unlikely to be affected by disturbance from the surrounding environment.

Next, data such as the detected tip end coordinates of the bit 20, the temperature data, and the tightening completion torque value are recorded in association with each other in the storage device. Accordingly, it is possible to continually accurately trace task information of the presence or absence of a tightening task, the tightening torque, and the like of all bolts BT of the fluid control system 200.

In the present embodiment, as described above, while the image data for acquiring the tip end coordinates of the bit is continually captured, the torque-related data acquired from the torque sensor 30 is acquired independently from the image data. Then, accurate task information can be acquired by associating the acquired torque-related data and the tip end coordinate data of the bit 20 obtained from image data temporally compatible thereto.

For example, if the imaging of the tool is started upon reception of completion signal generated after the tightening task by the tool is completed, and the captured image data is processed to calculate the position coordinates of the tool or the like, deviation occurs between the time the task is completed and the time the position coordinates of the tool or the like are calculated, and thus the calculated position coordinates are not necessarily the position coordinates of the tool or the like at the time the task is completed.

In the present invention, because there is no temporal difference between the calculated tip end coordinate data of the bit 20 and the acquired torque-related data, more accurate task data can be obtained.

FIG. 10 illustrates a task management system according to another embodiment of the present invention.

In the system illustrated in FIG. 10, the PC 300 and the cameras 400A, 400B are connected by communication cables CA, CB. In this way, the image of the tool 1 can be acquired not only using a wireless system, but also a wired system.

As for the installation positions of the cameras 400A, 400B, when there are two as in the above-described embodiment, it is desirable that the viewpoint direction of the camera 400A and the viewpoint direction of the camera 400B are orthogonal to each other. It is sufficient that the images of the marker MKA and the marker MKB provided on the tool 1 can be captured from the time the worker starts the task to the time the worker completes the tightening of all hexagon socket bolts (fastening components) of the fluid control system 200. There is no need to capture the entire body of the worker, the gas box 500, or the fluid control system 200.

While, in the above-described embodiment, the maximum value of the peak value of the torque signal is transmitted from the tool 1 to the PC 300, the present invention is not necessarily limited thereto. For example, in addition to the maximum value of the peak value, a first peak value or a last peak value can also be set as the tightening completion torque, and an average value of the peak values can also be adopted.

Further, while, in the above-described embodiment, the measurement data of the tightening torque is recorded in the tool 1 and transmitted to the PC 300, it is also possible to only transmit the measurement data without recording the data in the tool 1, and record the data and detect a peak value in the PC 300.

While, in the above-described embodiment, the captured image data is stored in the frame buffer, the necessary image data is extracted from the frame buffer, and the coordinate data is calculated by image processing, the present invention is not necessarily limited thereto. It is also possible to sequentially perform image processing on the captured image data to calculate the coordinate data and the like, store the data in time series, and associate the time series data with the torque-related data.

DESCRIPTIONS OF REFERENCE NUMERALS

1 Driver (Tool)
10 Grip
11 Main body part
12 Bit holding part
12a Holding hole
13 Sensor mounting part
19 Auxiliary bar
20 Bit
20P Tip end coordinates
21 Tip end portion
22 Base end portion
23 Shaft part
24 Monitored part
30 Torque sensor
31 Case part
32 Mounting part
33 Detecting part
33a Through-hole
33b Coil holding part
35 Circuit housing part
36 Coil
39 Cavity
50 Excitation coil
51 Detection coil
52 Analog circuit
53, 70 DC/DC converter
54 Comparator
55 Reference voltage setting circuit
60 Microcomputer
61 Analog-digital converter (ADC)
62 Temperature sensor
63 Real time clock
64 Serial bus
65 Communication module
66 ROM
67 Data input terminal
68 Memory card
69 Reset IC
71 Calibration switch
72 Power switch
73 Battery
74 Charging control circuit
75 Charging connector
110 Oscillation circuit
120 Buffer amplifier
130 Phase adjusting circuit
140 V-I converter
160 Inverter
170 Synchronization detecting circuit
180 Inverting amplifier
200 Fluid control system
210, 220, 230, 240, 250, 280 Fluid device
260, 270 Joint block
300 PC (Processing device)
400A, 400B Camera (Imaging device)
500 Gas box
500b Bottom surface
BS Base plate metal
BT Hexagon socket bolt
CA, CB Communication cable
CGA, CGB Center of gravity
MKA, MKB Marker
SG Torque signal
T1 Set time
Th Set threshold value

What is claimed is:

1. A task management device for managing a tightening task of tightening each of a plurality of fastening components included in a product by using a tool,
the tool including a torque sensor capable of detecting a tightening torque for tightening a fastening component acting on a bit,
the torque sensor initiating recording of measurement data of the tightening torque when the tightening torque detected exceeds a set threshold value, completing measurement when the tightening torque detected falls below the set threshold value and a set time elapses, and outputting torque-related data based on measurement data including a measurement time from measurement initiation to measurement completion,
the task management device being configured to, when the torque-related data is received, extract and process, from among a plurality of images of the tool captured from a plurality of viewpoints during a tightening task of one fastening component, a plurality of images corresponding to the measurement time included in the torque-related data, and detect an engagement position of the bit that engages with the one fastening component.

2. The task management device according to claim 1, wherein the plurality of images of the tool include at least the first marker and the second marker.

3. A task management system for managing a tightening task of tightening each of a plurality of fastening components included in a product, the task management system comprising:
a tool including a torque sensor capable of detecting a tightening torque for tightening a fastening component acting on a bit, and a first marker and a second marker for image processing,
the torque sensor initiating recording of measurement data of the tightening torque when the tightening torque detected exceeds a set threshold value, completing measurement when the tightening torque detected falls below the set threshold value and a set time elapses, and outputting torque-related data formed on the basis of measurement data from measurement initiation to measurement completion;
a first imaging device and a second imaging device that are disposed in predetermined positions relative to the product, and capture images of the tool that include at least the first marker and the second marker during the tightening task from mutually different viewpoints;
a storage device that stores the images captured by the first imaging device and the second imaging device; and
a processing device that, when the torque-related data is received, extracts and processes, from among a plurality of images of the tool captured from a plurality of viewpoints during a tightening task of one fastening component and stored in the storage device, a plurality of images corresponding to the measurement time included in the torque-related data, and detects an engagement position of the bit that engages with the one fastening component.

* * * * *